United States Patent
Maddukuri et al.

(10) Patent No.: US 11,237,618 B2
(45) Date of Patent: Feb. 1, 2022

(54) SYSTEM AND METHOD TO MAINTAIN OPTIMAL SYSTEM PERFORMANCE WITHIN USER DEFINED SYSTEM LEVEL POWER CAP IN A CHANGING WORKLOAD ENVIRONMENT

(71) Applicant: DELL PRODUCTS L.P., Round Rock, TX (US)

(72) Inventors: Akkiah Choudary Maddukuri, Austin, TX (US); Arun Muthaiyan, Round Rock, TX (US); Jun Gu, Austin, TX (US); Eugene Cho, Austin, TX (US); Dit Charoen, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 102 days.

(21) Appl. No.: 16/039,618

(22) Filed: Jul. 19, 2018

(65) Prior Publication Data

US 2020/0026344 A1    Jan. 23, 2020

(51) Int. Cl.
*G06F 1/3287* (2019.01)

(52) U.S. Cl.
CPC ................... *G06F 1/3287* (2013.01)

(58) Field of Classification Search
CPC .... G06F 1/3287; G06F 1/3296; G06F 1/3206; G06F 1/324; G06F 1/3275; G06F 11/3062; G06F 1/26; G06F 1/3203; G06F 1/3234; G06F 1/3243; G06F 3/0625
USPC ................ 713/320, 300, 323, 322, 324, 340
See application file for complete search history.

(56) References Cited

U.S. PATENT DOCUMENTS

| | | | |
|---|---|---|---|
| 6,711,691 B1* | 3/2004 | Howard | G06F 1/3237 713/300 |
| 8,214,677 B2* | 7/2012 | Burton | H02M 3/1584 323/212 |
| 8,659,263 B2 | 2/2014 | Oglesbee et al. | |
| 8,693,228 B2 | 4/2014 | Matan et al. | |
| 8,898,026 B2 | 11/2014 | Howell et al. | |
| 9,280,796 B2 | 3/2016 | Synesiou et al. | |
| 9,431,828 B2 | 8/2016 | Besser et al. | |
| 9,690,313 B2 | 6/2017 | Matan et al. | |
| 9,808,375 B2 | 11/2017 | Cornelius et al. | |
| 9,960,601 B2 | 5/2018 | Matan et al. | |
| 10,003,196 B2 | 6/2018 | Matan et al. | |
| 10,063,055 B2 | 8/2018 | Matan et al. | |
| 10,097,078 B2 | 10/2018 | Rayner et al. | |
| 10,158,232 B2 | 12/2018 | Matan et al. | |
| 10,158,233 B2 | 12/2018 | Besser et al. | |
| 10,185,346 B2 | 1/2019 | Matan et al. | |
| 10,285,233 B2 | 5/2019 | Muyshondt | |
| 2003/0126475 A1* | 7/2003 | Bodas | G06F 1/28 713/300 |

(Continued)

*Primary Examiner* — Faisal M Zaman
(74) *Attorney, Agent, or Firm* — Jackson Walker LLP; Christopher J. Rourk

(57) ABSTRACT

A system for controlling power settings is provided that includes a plurality of components, each component configured to implement a power control algorithm. A controller is coupled to each component and configured to control a power state of each component as a function of the power control algorithm for each component. The controller comprises a state machine having a plurality of states, wherein the power control algorithm of each component is controlled by the controller as a function of a state of the state machine.

14 Claims, 2 Drawing Sheets

(56) References Cited

U.S. PATENT DOCUMENTS

| | | | |
|---|---|---|---|
| 2006/0080563 A1* | 4/2006 | Perozo | G06F 1/3203 713/322 |
| 2006/0174144 A1* | 8/2006 | Kim | G06F 1/3228 713/300 |
| 2007/0124355 A1* | 5/2007 | Johns | G06F 1/206 708/270 |
| 2007/0168759 A1* | 7/2007 | Goodnow | G06F 11/008 714/47.2 |
| 2009/0293072 A1* | 11/2009 | Elshocht | G06F 1/3287 719/327 |
| 2010/0037074 A1* | 2/2010 | Bencak | G06F 1/266 713/320 |
| 2012/0054518 A1* | 3/2012 | Sadowski | G06F 1/3203 713/322 |
| 2012/0324246 A1* | 12/2012 | Rahardjo | G06F 1/26 713/300 |
| 2015/0134985 A1* | 5/2015 | Gopal | G06F 1/32 713/320 |
| 2015/0244210 A1* | 8/2015 | Kolhatkar | G06F 1/30 307/23 |
| 2017/0110770 A1* | 4/2017 | Marcicki | B60K 1/04 |
| 2018/0018118 A1* | 1/2018 | Raghava | G06F 1/08 |
| 2019/0302871 A1* | 10/2019 | Moschopoulos | G06F 1/3243 |

\* cited by examiner

SYSTEM AND METHOD TO MAINTAIN OPTIMAL SYSTEM PERFORMANCE WITHIN USER DEFINED SYSTEM LEVEL POWER CAP IN A CHANGING WORKLOAD ENVIRONMENT

TECHNICAL FIELD

The present disclosure relates generally to control of power levels within a complex system, and more specifically to a system and method to maintain optimal system performance within user defined system level power cap in a changing workload environment.

BACKGROUND OF THE INVENTION

Changing workload for different components and subsystems within a system can result in oscillation of power settings or other adverse effects, even under steady state load conditions. These adverse effects lower system performance and quality.

SUMMARY OF THE INVENTION

A system for controlling power settings is provided that includes a plurality of components, each component configured to implement a power control algorithm. A controller is coupled to each component and configured to control a power state of each component as a function of the power control algorithm for each component. The controller comprises a state machine having a plurality of states, wherein the power control algorithm of each component is controlled by the controller as a function of a state of the state machine.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings may be to scale, but emphasis is placed upon clearly illustrating the principles of the present disclosure. Moreover, in the drawings, like reference numerals designate corresponding parts throughout the several views, and in which.

DETAILED DESCRIPTION OF THE INVENTION

Figure 1:
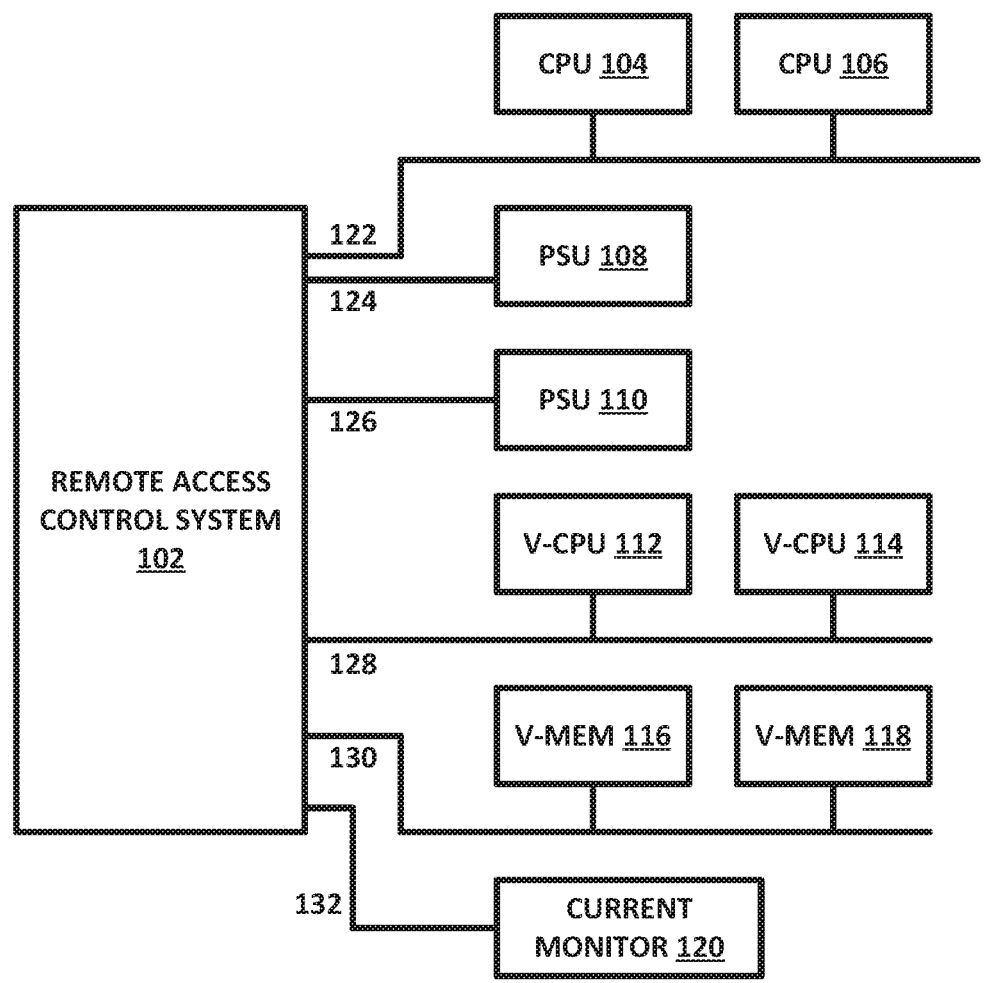
FIG. 1 is a diagram of a system for implementing a state machine for power level control, in accordance with an example embodiment of the present disclosure.

In the description that follows, like parts are marked throughout the specification and drawings with the same reference numerals. The drawing figures may be to scale and certain components can be shown in generalized or schematic form and identified by commercial designations in the interest of clarity and conciseness.

Controlling the maximum power consumption or "power cap" based on power consumption requires the ability to accommodate input from many asynchronous events. For example, changing work load conditions, power supply unit (PSU) losses, changing power control policies for devices or systems, and changes to subsystems themselves can result in changes to loads. Components in each subsystem can also have various loads, in addition to supporting closed loop operations, where the output from one component or system is also used as an input to that component or system, in a next iteration. All of these components can implement different control algorithms, including algorithms to raise limits, reduce limits, throttle, and to take other actions to get an optimal power setting that is within predetermined limits. Without suitable power controls, the power settings of different system components can oscillate and cause undesirable operation.

A power limit control is usually provided at a system or subsystem level, and has to be converted to individual subsystem level requests. Based on the asynchronous events occurring for each system, subsystem and component, a continuous determination needs to be made for each new system or subsystem power level request. All of these parameters require an approach that can handle complex asynchronous events and help determine the new power control setting value.

The problem can thus be broken down into multiple sub-problems. First, there is the need to continuously ensure that power consumption is within predetermined limits. Second, there is a need to achieve an optimal power consumption level without throttling the power level down too much, which can result in a lower operational quality for no reason. Third, there is a need to avoid unnecessary power consumption variations when there is uniform load. Fourth, there is a need to bring down the power consumption within the requested power cap as quick as possible. Fifth, when a load goes away or drops below a threshold, there is a need to remove the limit, in order to determine the new correct limit based on new load. Sixth, when the load is well below the requested power cap, but above the threshold, there is a need to redistribute the power to different subsystems.

There are a number of different reasons that can result in oscillation, and these are addressed by the current disclosure. One of these reasons is when operational control of a component is based on consumption data that is not current. For example, power consumption data that is received from a power supply can be delayed by 100 ms or more, and thus may be the result of a previous input or system configuration. This delay in power consumption data can also create oscillation, because device or subsystem output can potentially be used an input to the power control algorithm. To address this reason, the power control algorithms of each system, component and discrete device should be coordinated, and system power levels should be allowed to stabilize under certain conditions before modifications are determined.

Whenever a power setting for a CPU component is adjusted, that adjustment can also indirectly affect other subsystem power settings, because reduced CPU power can also result in reduced power load at other subsystems that are driven by the CPU. As such, a reduction in CPU power can result in a greater than anticipated reduction, because the specific CPU loading is a stochastic event. Similarly, when power to the CPU is increased, that increase can result in an increase in other subsystem power settings. To address this reason, the power control algorithms of each system, component and discrete device should be coordinated, and system power levels should be allowed to stabilize under certain conditions before modifications are determined.

Another source of oscillation is that user power caps are usually specified for input power levels, but subsystem power consumption is usually measured at a subsystem output. Another reason is that there can be approximations used for converting power consumption data from one unit to another, and these approximations can result in oscillation. To address these reasons, the power control algorithms of each system, component and discrete device should be coordinated, and system power levels should be allowed to stabilize under certain conditions before modifications are determined.

In order to address these and other problems, a system and method are disclosed that implement a state machine based on different algorithms or controls used by components or systems as part of the power regulation process. The states of the state machine can include identifying the pre-conditions for the approaches, and then adding implementations for the preconditions and algorithms, such as a ramp down phase, a steady state phase, a step up phase and other suitable phases. When any asynchronous event happen, such as one of those mentioned above or other events having an impact on power settings, the controller, such as an integrated Dell Remote Access Controller (iDrac), which is available from Dell.com and also from Dell of Austin, Tex., or other suitable controllers that are used to implement the state machine can identify the new state based on the current state and system power consumptions. The power control algorithms for each component are then applied based on the new state, where the power control algorithm for each component can be different for each state.

In one example embodiment, 11 states can be defined for the power control state machine, such as:

State 0—the state at which an initial detection is made that a power control activation is needed.

State 1—a state for special situations that require application of the maximum power control throttle, which can happen at any time.

State 2—the state at which a downward slope is determined and applied.

State 3—an error message is logged whenever an activation goal cannot be achieved.

State 4—this state is entered as soon as power use drops below a defined power limit.

State 5—in this state, a waiting period is entered before initiating any change to step up or deactivate power. The system can be doing anything during this time and no action will be taken.

State 6—in this state, the power to the CPU and/or memory is stepped up or deactivated.

State 7—in this state, all settings are maintained until a predetermined percentage of the power limit is reached, such as 70%.

State 8—in this state, the power limits that were set are removed, such as for memory and CPU.

State 9—in this state, cleanup is performed to allow the system to go back to an idle state, such as by resetting predetermined settings.

State 10—in this state, the system is idle and there is no need to send i2c commands during the PM_CONTROL segment or other predetermined control segments.

The present disclosure thus provides a system and method that includes a state machine that provides the ability to handle the power capping for different asynchronous events. Depending on the state in which the state machine is in when an event occurs, the response to the event will be constrained to prevent oscillation or other undesired operating conditions from occurring.

FIG. 1 is a diagram of a system 100 for implementing a state machine for power level control, in accordance with an example embodiment of the present disclosure. System 100 includes remote access control system 102, central processing units (CPUs) 104 and 106, power supply units (PSUs) 108 and 110, CPU voltage regulators (V-CPUs) 112 and 114, memory voltage regulators (V-MEMs) 116 and 118, current monitor 120, and communications ports 122 through 132, each of which can be implemented in hardware or a suitable combination of hardware and software.

Remote access control system 102 is used to implement a state machine for controlling power consumption algorithms of the associated components and subsystems of system 100, and can be an iDRAC or other suitable controllers. In one example embodiment, the state machine can be implemented using object oriented programming or other suitable programming paradigms that allow power control algorithms operating on other systems and components of system 100 to be controlled in a coordinated manner.

CPUs 104 and 106 can be general purpose CPUs, and include one or more power control algorithms that can include user-selectable configuration settings, such as maximum and minimum power settings, thermal settings, frequency settings or other suitable settings. Each CPU can thus implement its own power control scheme, independent of the overall system power control.

PSUs 108 and 110 can be general purpose OSUs, and include one or more power control algorithms that can include user-selectable configuration settings, such as maximum and minimum power settings, thermal settings, voltage settings, current settings or other suitable settings. Each PSU can thus implement its own power control scheme, independent of the overall system power control.

CPU voltage regulator (V-CPU) 112 and 114 are used to control the voltage provided to a corresponding CPU, such as one of CPUs 104 and 106. V-CPU 112 and 114 can be used to implement a power control algorithm, can implement separate and stand-alone power control algorithms and can perform other suitable functions.

Memory voltage regulator (V-MEM) 116 and 118 are used to control the voltage provided to a corresponding memory unit. V-MEM 116 and 118 can be used to implement a power control algorithm, can implement separate and stand-alone power control algorithms and can perform other suitable functions.

Current monitor 120 monitors electrical current provided to one or more system components, such as CPUs 104 and 106, PSU 108 and 110, V-CPU 112 and 114, V-MEM 116 and 118 or other suitable components. Current monitor 120 can be used to implement a power control algorithm, can implement separate and stand-alone power control algorithms and can perform other suitable functions.

Communications ports 122 through 132 are used to provide communications between remote control access system 102 and other components of system 100. In one example embodiment, communications ports 122 through 132 can use the server message block (SMB) communications protocol or other suitable communications protocols.

In operation, remote access control system 102 is configured to provide a state machine to control the power control algorithms of the separate systems and components of system 100. For example, the state machine of remote access control system 102 can have predetermined number of allowable states and defined state transitions that are used to prevent operation outside of the defined states. For example, 11 defined states can be provided, including:

State 0—a state at which an initial detection is made that a power control activation is needed for one or more of CPUs 104 and 106, PSUs 108 and 110, V-CPUs 112 and 114, V-MEM 116 and 118 and current monitor 120. The initial detection can be performed by the state machine operating on remote access control system 102, on one of the controlled systems or components, or in other suitable manners. This state can be a transient state, where the system changes to one or more of the other stable states.

State 1—a state for special situations that require application of the maximum power control throttle for one or more of CPUs 104 and 106, PSUs 108 and 110, V-CPUs 112 and 114, V-MEM 116 and 118 and current monitor 120, which can happen at any time. The determination can be performed by the state machine operating on remote access control system 102, on one of the controlled systems or components, or in other suitable manners.

State 2—the state at which a downward slope is determined and applied to one or more of CPUs 104 and 106, PSUs 108 and 110, V-CPUs 112 and 114, V-MEM 116 and 118 and current monitor 120. The downward slope can be determined and applied by the state machine operating on remote access control system 102, by one of the controlled systems or components, or in other suitable manners.

State 3—the state at which an error message is logged whenever an activation goal cannot be achieved by one or more of CPUs 104 and 106, PSUs 108 and 110, V-CPUs 112 and 114, V-MEM 116 and 118 and current monitor 120. The error message can be determined and generated by the state machine operating on remote access control system 102, by one of the controlled systems or components, or in other suitable manners.

State 4—this state is entered into by one or more of CPUs 104 and 106, PSUs 108 and 110, V-CPUs 112 and 114, V-MEM 116 and 118 and current monitor 120 deactivating power control as soon as power use drops below a defined power limit. The deactivation of power control can be determined and applied by the state machine operating on remote access control system 102, by one of the controlled systems or components, or in other suitable manners.

State 5—in this state, a waiting period is entered by one or more of CPUs 104 and 106, PSUs 108 and 110, V-CPUs 112 and 114, V-MEM 116 and 118 and current monitor 120 before initiating any change to step up or deactivate power. The system can be doing anything during this time and no action will be taken by any of one or more of CPUs 104 and 106, PSUs 108 and 110, V-CPUs 112 and 114, V-MEM 116 and 118 and current monitor 120. The waiting period can be entered into by the state machine operating on remote access control system 102, by one of the controlled systems or components, or in other suitable manners.

State 6—in this state, the power to the CPU and/or memory is stepped up or deactivated, such as by controlling one or more of CPUs 104 and 106, PSUs 108 and 110, V-CPUs 112 and 114, V-MEM 116 and 118 and current monitor 120. The stepping up or deactivation of power can be determined and applied by the state machine operating on remote access control system 102, by one of the controlled systems or components, or in other suitable manners.

State 7—in this state, all settings of one or more of CPUs 104 and 106, PSUs 108 and 110, V-CPUs 112 and 114, V-MEM 116 and 118 and current monitor 120 are maintained until a predetermined percentage of the power limit is reached, such as 70%. The settings can be maintained by the state machine operating on remote access control system 102, by one of the controlled systems or components, or in other suitable manners.

State 8—in this state, the power limits that were set for one or more of CPUs 104 and 106, PSUs 108 and 110, V-CPUs 112 and 114, V-MEM 116 and 118 and current monitor 120 are removed, such as for memory and CPU. The power limits can be removed by the state machine operating on remote access control system 102, by one of the controlled systems or components, or in other suitable manners.

State 9—in this state, cleanup of one or more of CPUs 104 and 106, PSUs 108 and 110, V-CPUs 112 and 114, V-MEM 116 and 118 and current monitor 120 is performed to allow the system to go back to an idle state, such as by resetting predetermined settings. Cleanup can be performed by the state machine operating on remote access control system 102, by one of the controlled systems or components, or in other suitable manners. This state can be a transient state, where the system changes to one or more of the other stable states.

State 10—in this state, the system is idle and there is no need to send SMB commands. When the state machine is activated, the state migrates to state 0 from this state.

In operation, system 100 provides a hardware structure associated with a state machine that allows the state machine to control power consumption in a complex system, such as a server that includes multiple subsystems and components that each have their own power control algorithms and processes. System 100 thus provides the technical advantage of reducing power consumption in a complex system without creating oscillatory behavior or other undesired system operation, such as modification of power levels during steady state operation.

Figure 2:
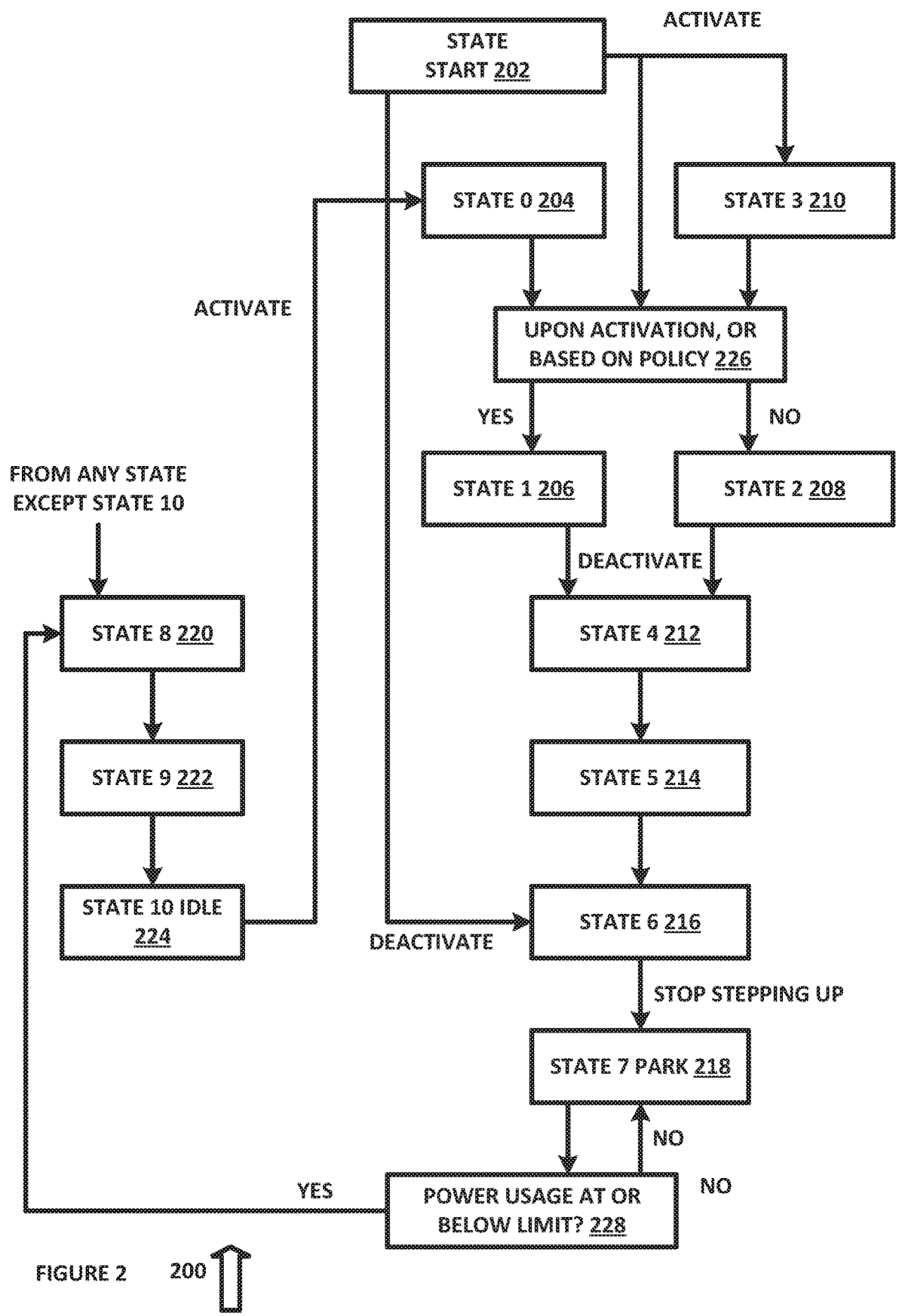
FIG. 2 is a diagram of an algorithm for implementing a state machine for power level control, in accordance with an example embodiment of the present disclosure.

FIG. 2 is a diagram of an algorithm 200 for implementing a state machine for power level control, in accordance with an example embodiment of the present disclosure.

Algorithm 200 includes start state 202, which can be entered when power use by the system is above a power limit and needs to be reduced. State 202 can migrate to state 3 210, if an attempt has been made to start without any system response, or can alternatively migrate to 226 upon activation or based on a specific power control policy.

State 0 204 is a start state that is entered from state 10 224 or other suitable states. Although specific state migrations are shown in the example embodiment of algorithm 200, other suitable state migrations can also or alternatively be used, with the understanding that one technical feature of the present disclosure is specified states with specified state transitions, to ensure that conflicting power control policies do not result in oscillations, power control during steady state operation or other unwanted behavior.

State 1 206 is a floor state, where a power control setting for a system or component is at the lowest level. In one example embodiment, a controller can generate a control signal to cause one or more components to reduce a power consumption level to a lowest operable level, such as a lowest level above being shut down, a lowest level permitted under a current power setting, or other suitable levels. In this regard, state 1 206 can coordinate one or more power control algorithms of one or more discrete devices, systems, components or other suitable algorithms. State 1 206 is migrated to from start state 202, state 0 204 or state 3 210, if the associated algorithm requires that the lowest power level be set.

State 2 208 is a state for stepping power settings down in a predetermined incremental step. In one example embodiment, a controller can generate a control signal to cause one or more components to reduce a power consumption level by one steps, a series of steps or in other suitable manners. In this regard, state 2 208 can coordinate one or more power control algorithms of one or more discrete devices, systems, components or other suitable algorithms. State 2 208 is migrated to from start state 202, state 0 204 or state 3 210, if algorithm 200 does not require that the lowest power level be set but rather requires a stepped approach to power level control.

State 3 210 is a state for logging an error, such as when a power goal was unable to be achieved. In one example embodiment, after beginning from a start state, if the appropriate action (such as going to a lowest level of stepping down power) cannot be achieved, algorithm 200 migrates from state 0 202 to state 3 210, where an error log entry is generated.

State 4 212 is a state for the system after the system power is below a predetermined power limit. In one example embodiment, the power use can be monitored at one or more power monitors, such as for the system, for one or more discrete devices, components or subsystems, for a plurality of discrete devices, components or subsystems or in other suitable manners, and when the power level drops below a lower limit, algorithm 200 can generate one or more commands to discontinue reduction in power. State 4 212 is migrated to from state 1 206 or state 2 208.

State 5 214 is a state during which the system waits for a predetermined period of time before stepping power up or down. In one example embodiment, the time can be monitored, such as for the system, for one or more discrete devices, components or subsystems, for a plurality of discrete devices, components or subsystems or in other suitable manners, and when a predetermined period of time has elapsed, algorithm 200 can generate one or more commands to step power up or down or to discontinue the operation of algorithm 200. State 5 214 is migrated to from state 4 212.

State 6 216 is a state during which the system steps up or deactivates power control for CPUs, memory devices or other suitable devices. In one example embodiment, state 6 can be implemented as needed to maintain operations of specific devices such as CPUs, memory or other suitable devices. State 6 216 is migrated to from state 5 214 or start state 202.

State 7 218 is a state in which the system stops increasing or stepping up power to one or more devices until a predetermined power level is reached, such as 70%. In one example embodiment, the power level can be monitored, such as for the system, for one or more discrete devices, components or subsystems, for a plurality of discrete devices, components or subsystems or in other suitable manners, and when a power level of 70% has been reached, algorithm 200 can generate one or more commands to stop stepping power up or down. State 7 218 is migrated to from state 6 216.

State 8 220 is a state in which the system removes power limits that were set for one or more systems, components or discrete devices. In one example embodiment, the power level can be monitored, such as for the system, for one or more discrete devices, components or subsystems, for a plurality of discrete devices, components or subsystems or in other suitable manners, and when it is determined at 228 that power usage is at or below a limit, algorithm 200 can generate one or more commands to remove limits that were set for CPUs, memory devices or other suitable systems, components or discrete devices. State 8 220 is migrated to from state 7 218, or can be reached directly from any other state than state 10 224.

State 9 222 is a state in which the system cleans up settings to allow it to return to an idle state. In one example embodiment, one or more algorithm variables can be reinitialized, or other suitable processes can also or alternatively be implemented. State 9 222 is migrated to from state 8 220.

State 10 224 is an idle state, during which there is no need to send inter-integrated circuit commands, such as SMB commands or other suitable commands. State 10 224 is migrated to from state 9 222.

Although algorithm 200 is shown as a state machine, one or more flow charts, one or more objects or agents, one or more threads or other suitable programming paradigms can also or alternatively be used to implement algorithm 200.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes one or more microcomputers or other suitable data processing units, memory devices, input-output devices, displays, data input devices such as a keyboard or a mouse, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections. The term "data" can refer to a suitable structure for using, conveying or storing data, such as a data field, a data buffer, a data message having the data value and sender/receiver address data, a control message having the data value and one or more operators that cause the receiving system or component to perform a function using the data, or other suitable hardware or software components for the electronic processing of data.

In general, a software system is a system that operates on a processor to perform predetermined functions in response to predetermined data fields. For example, a system can be defined by the function it performs and the data fields that it performs the function on. As used herein, a NAME system, where NAME is typically the name of the general function that is performed by the system, refers to a software system that is configured to operate on a processor and to perform the disclosed function on the disclosed data fields. Unless a specific algorithm is disclosed, then any suitable algorithm that would be known to one of skill in the art for performing the function using the associated data fields is contemplated as falling within the scope of the disclosure. For example, a message system that generates a message that includes a sender address field, a recipient address field and a message field would encompass software operating on a processor that can obtain the sender address field, recipient address field and message field from a suitable system or device of the processor, such as a buffer device or buffer system, can assemble the sender address field, recipient address field and message field into a suitable electronic message format (such as an electronic mail message, a TCP/IP message or any other suitable message format that has a sender address field, a recipient address field and message field), and can transmit the electronic message using electronic messaging systems and devices of the processor over a communications medium, such as a network. One of ordinary skill in the art would be able to provide the specific coding for a specific application based on the foregoing disclosure, which is intended to set forth exemplary embodiments of the present disclosure, and not to provide a tutorial for someone having less than ordinary skill in the art, such as someone who is unfamiliar with programming or processors in a suitable programming language. A specific algorithm for performing a function can be provided in a flow chart form or in other suitable formats, where the data fields and associated functions can be set forth in an exemplary order of operations, where the order can be rearranged as suitable and is not intended to be limiting unless explicitly stated to be limiting.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling power settings, comprising:
   a plurality of components, each component configured to implement a separate and stand-alone power control algorithm for that component;
   a controller coupled to each component and configured to asynchronously control a power state of each component as a function of the power control algorithm for each component; and
   wherein the controller comprises a state machine having a plurality of states, wherein the power control algorithm of each component is asynchronously controlled by the controller as a function of a state of the state machine;
   wherein the state machine comprises a first state for starting power control of the system and a second state for setting a first power control for the power control algorithm at a central processing unit as a function of a first power supply loss and a second power control algorithm for the power control algorithm at a power supply unit to a lowest level as a function of the power control algorithm for a power supply loss for each component, and wherein the first state migrates to the second state to prevent oscillation, a third state for deactivating the second state using the first power control algorithm and the second power control algorithm and a current state of the system, and a third power control algorithm for a voltage regulator when a predetermined power level is reached as a function of a change in workload, and wherein the state machine migrates from the second state to the third state.

2. The system of claim 1 wherein the state machine comprises a fourth state for waiting a predetermined period of time before beginning to increase power as a function of a change in a power control policy, and wherein the state machine only migrates from the third state to the fourth state.

3. The system of claim 2 wherein the state machine comprises a fifth state for increasing power for a plurality of components in one or more steps as a function of the power control algorithm for each component and a change to an associated system associated with one of the plurality of components, and wherein the state machine only migrates from the fourth state to the fifth state and also migrates from the first state to the fifth state.

4. The system of claim 3 wherein the state machine comprises a sixth state for maintaining a power level for a plurality of components as a function of the power control algorithm for each component, and wherein the state machine migrates from the fifth state to the sixth state.

5. A method for controlling power settings, comprising:
   configuring each of a plurality of components to implement a first power control algorithm that is stored at each component that is associated with a processor and a second power control algorithm that is stored at each component that is associated with a voltage regulator;
   configuring a controller remotely coupled to each component to asynchronously control a power state of each component using a statement machine at the controller having a plurality of states that interfaces with the power control algorithm of each component and as a function of the power control algorithm for each component; and
   asynchronously controlling the power control algorithm of each component as a function of a state of a state machine; wherein the state machine comprises a first state for starting power control of the system and a second state for setting a first power control for the power control algorithm at a central processing unit as a function of a first power supply loss and a second power control algorithm for the power control algorithm at a power supply unit to a lowest level as a function of the power control algorithm for a power supply loss for each component, and wherein the first state migrates to the second state to prevent oscillation, a third state for deactivating the second state using the first power control algorithm and the second power control algorithm and a current state of the system, and a third power control algorithm for a voltage regulator when a predetermined power level is reached as a function of a change in workload, and wherein the state machine migrates from the second state to the third state.

6. The method of claim 5 further comprising migrating to a fourth state for waiting a predetermined period of time before beginning to increase power from the third state for the second power control algorithm while maintaining the first state using the first power control algorithm.

7. The method of claim 6 further comprising migrating to a fifth state for increasing power for a plurality of components in one or more steps as a function of the power control algorithm for the second power control algorithm, a first power cap for a first component of the plurality of components and a second power cap for a second component of the plurality of components, the first power cap being different than the second power cap, while maintaining the first state using the first power control algorithm.

8. The method of claim 7 further comprising migrating to a sixth state for maintaining a power level for a plurality of components as a function of the power control algorithm for the second power control algorithm while migrating from the first state to the second state using the first power control algorithm.

9. A system for controlling power settings, comprising:
a plurality of components, each component configured to implement a separate and stand-alone power control algorithm for that component that is at the component;
a controller remotely coupled to each component and configured to asynchronously control a power state of each component using a state machine at the controller as a function of the power control algorithm for each component; and
wherein the controller remotely interfaces with the power control algorithm of each component, and implements a state machine that comprises a first state for starting power control of the system and a second state for setting a first power control for the power control algorithm at a central processing unit as a function of a first power supply loss and a second power control algorithm for the power control algorithm at a power supply unit to a lowest level as a function of the power control algorithm for a power supply loss for each component, and wherein the first state migrates to the second state to prevent oscillation, a third state for deactivating the second state using the first power control algorithm and the second power control algorithm and a current state of the system, and a third power control algorithm for a voltage regulator when a predetermined power level is reached as a function of a change in workload, and wherein the state machine migrates from the second state to the third state.

10. The system of claim 9 wherein the state machine comprises a fourth state for waiting a predetermined period of time before beginning to increase power, and wherein the state machine migrates from the third state to the fourth state.

11. The system of claim 10 wherein the state machine comprises a fifth state for increasing power for a plurality of components in one or more steps as a function of the power control algorithm for each component, a power cap for a first component and a minimum power threshold for a second component, and wherein the state machine migrates from the fourth state to the fifth state.

12. The system of claim 11 wherein the state machine comprises a sixth state for maintaining a power level for a plurality of components as a function of the power control algorithm for each component, and wherein the state machine migrates from the fifth state to the sixth state.

13. The system of claim 1 wherein the state machine is implemented on a remote access controller.

14. The system of claim 1 wherein the state machine is implemented on a remote access controller and a state for the power control algorithm at each of the plurality of components is independently updated at the remote access controller.

* * * * *